Aug. 4, 1959                     C. J. MERCHANT                     2,897,712
                      EDUCATIONAL KEYBOARD MUSICAL INSTRUMENT
Filed Jan. 24, 1955                                                  2 Sheets-Sheet 1

INVENTOR.
CHARLES J. MERCHANT
BY
William J. Flynn
ATTORNEY

Aug. 4, 1959  C. J. MERCHANT  2,897,712
EDUCATIONAL KEYBOARD MUSICAL INSTRUMENT
Filed Jan. 24, 1955  2 Sheets-Sheet 2

*INVENTOR.*
CHARLES J. MERCHANT
BY
William J. Flynn
ATTORNEY

2,897,712

EDUCATIONAL KEYBOARD MUSICAL INSTRUMENT

Charles J. Merchant, Cleveland Heights, Ohio, assignor of fifteen percent to Walter J. Braner, Lakewood, Ohio Application January 24, 1955, Serial No. 483,679

4 Claims. (Cl. 84—477)

This invention relates generally to an educational keyboard musical instrument and particularly to a toy piano.

For the purpose of stimulating the musical interest of children of tender years various types of toy pianos have been devised. However, a child's interest in such an instrument often is limited by his own inability to play musical selections known to him. Accordingly, the need exists for such a toy piano having provision for effectively aiding the child to pick out on a keyboard the notes making up a song.

The present invention is directed to a toy piano having provision for illuminating the next key to be struck, so that by striking the successively illuminated keys the child plays a song. In accordance with the present invention there are provided a plurality of light sources positioned to illuminate the keys individually and a perforated record sheet which passes across the light sources, with the positions of the respective perforations determining which key is illuminated. The perforations are arranged so that the keys which are illuminated successively play a preselected song.

It is an object of this invention to provide a keyboard musical instrument having novel provision for illuminating successively each key to be played in a particular musical selection.

It is also an object of this invention to provide a novel toy piano in which the keys are illuminated in succession under the control of a record member which may be of any desired length in order that a musical selection of the corresponding length may be played.

Another object of this invention is to provide a toy piano having a novel arrangement for illuminating each key to be played which is dependable in operation and well adapted to withstand normal use to which it is subjected.

Other and further objects and advantages of the present invention will be apparent from the following description of two preferred embodiments, illustrated in the accompanying drawings.

Figure 4:
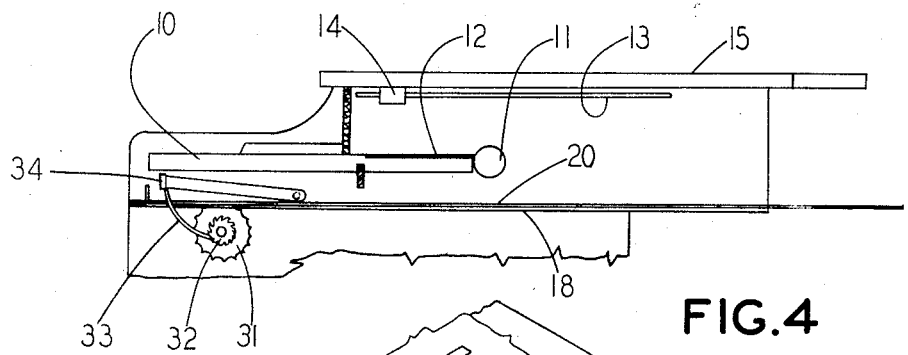
Figure 4 is a longitudinal section through the piano from front to back, taken along the right side of the piano and showing the mechanism for advancing the perforated record intermittently, in response to the playing of each key.

Referring to the drawing, the educational toy piano of the present invention is provided with the usual keyboard consisting of a plurality of pivoted individual keys 10 which play different notes in the musical scale. Each key 10 at its inner ends (Fig. 4) supports a wooden hammer member 11 mounted on the end of a flexible tongue 12 attached to the key. Overlying each hammer member is a cantilevered metal rod 13 having a predetermined frequency of vibration corresponding to the particular musical note designated by the corresponding key, so that when that key 10 is struck its hammer member 11 strikes the overlying rod 13 to produce the musical note. The several rods 13 are each supported in cantilever fashion by a block 14 attached to the underside of the piano top 15. Thus far in the description, the construction and operation of the piano are conventional.

Figure 1:
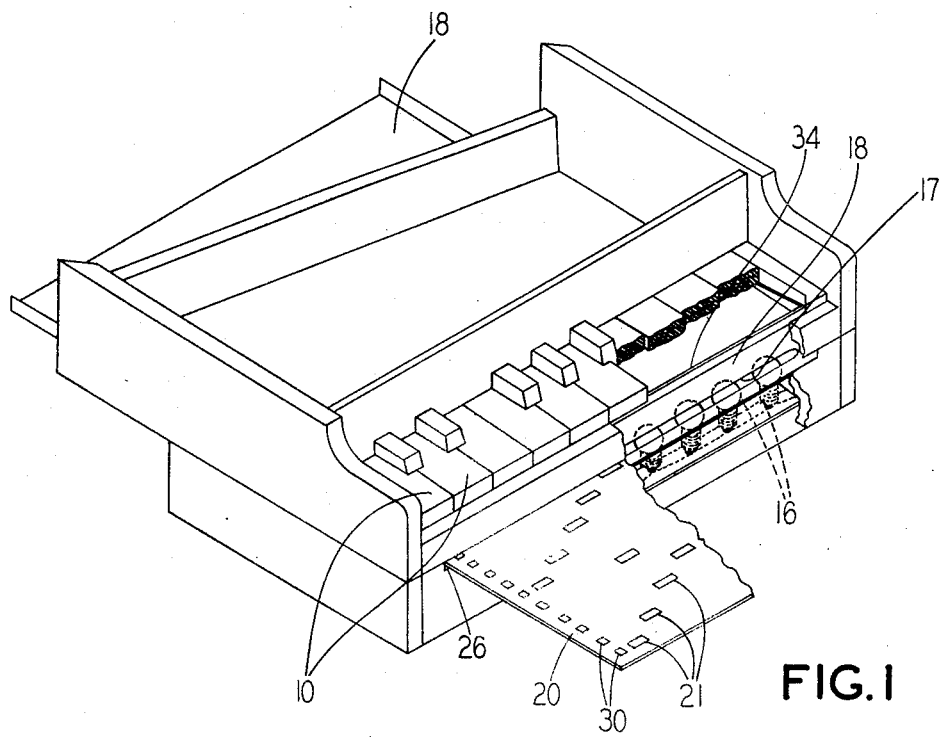
Figure 1 is a perspective view of the toy piano of the present invention, with the top removed and certain parts broken away for clarity.
Figure 2:
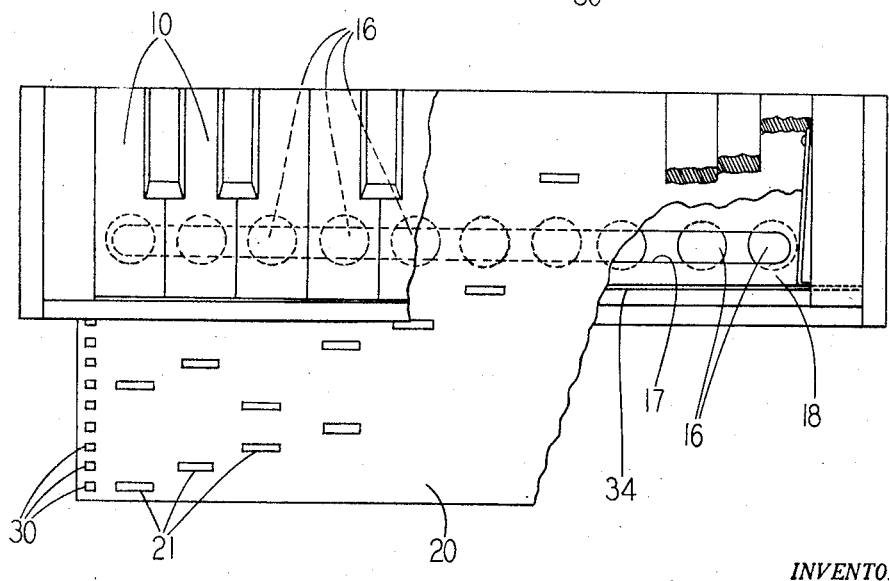
Figure 2 is a fragmentary top view, taken over the keyboard and with parts broken away.
Figure 3:
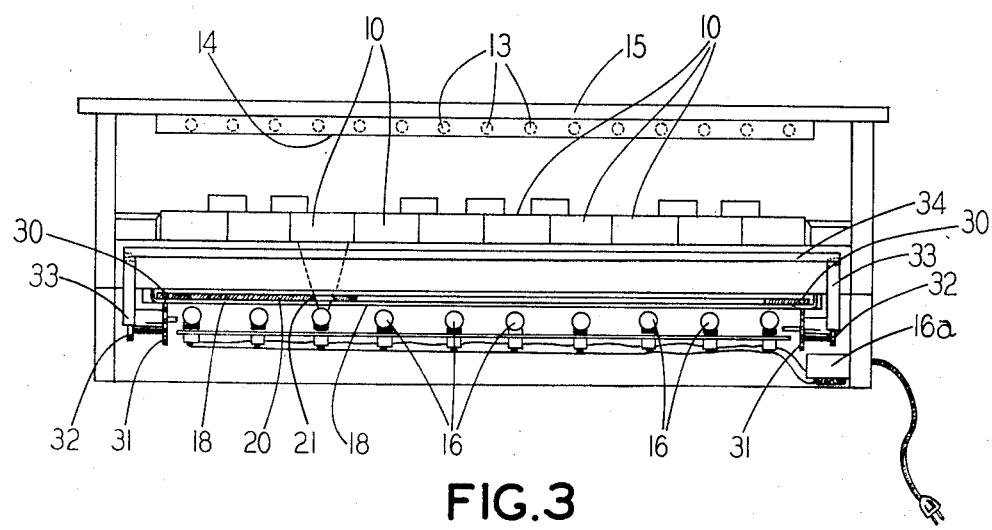
Figure 3 is a front view of the piano, with the front removed.

In accordance with the present invention there are provided a plurality of light sources in the form of small lamp bulbs 16, one underlying each key 10. In order to simplify the description lamps are provided for the white keys only, although it is to be understood that individual lamps for each of the black keys may also be provided, if desired. The several lamps 16 are positioned directly beneath a narrow slit 17 formed in an overlying opaque flat tray 18 projecting below the keyboard, this slit extending lengthwise the full length of the keyboard. Each lamp 16 shines a focused beam of light up through the slit 17 toward a corresponding individual key. The several lamps 16 are connected in parallel across the secondary winding of a transformer 16a (Fig. 3) whose primary may be connected across the standard 110–120 volt house current. The several lamps remain lit uninterruptedly throughout the operation of the piano.

For selectively controlling the illumination of the piano keys the present invention includes an effectively opaque record sheet 20 which passes over the slit 17. By "effectively opaque" is meant that the main body of the record sheet is effective to prevent the underlying light sources from shining a distinct spot of light up onto the corresponding overlying piano key. The record sheet 20 is formed with perforations 21 disposed in columns aligned individually with the respective piano keys, so that each piano key is illuminated when a perforation in the corresponding column on the record sheet overlies the slit 17, thereby permitting a beam of light from the corresponding lamp 16 to impinge on the underside of that key. The perforations in the several columns are disposed in a pattern such that as the record sheet passes over the slit 17 the keys are illuminated in a sequence corresponding to a desired musical selection. Accordingly, if the child strikes the illuminated keys in that sequence he will play that song on the piano.

In the illustrated embodiment of the present invention the record sheet 20 is guided in its movement by the shallow horizontal metal tray 18, which extends from the back of the piano up under the keys 10. The record sheet is inserted from the back of the piano and moves toward the keyboard and out a front opening 26 just below the keyboard.

In accordance with the particular embodiment of the invention which is illustrated in Figs. 1–4, the record sheet is advanced intermittently, moving forward each time a key is played. To this end the record sheet is formed at each side edge with evenly spaced sprocket holes 30. At each side of the piano, beneath the keyboard, there is provided a rotary sprocket 31 (Figs. 3 and 4) which has teeth positioned to be received in these sprocket holes so as to advance the record sheet in response to the sprocket's turning. Each sprocket 31 is attached to a ratchet wheel 32 so as to turn therewith.

Each ratchet wheel is positioned to be engaged by a depending resilient flexible spring finger 33 carried by a pivoted bar 34 which is disposed beneath each of the piano keys, extending the full length of the keyboard.

In operation, each time any of the piano keys is struck it depresses the pivoted bar 34, which in turn moves the depending spring fingers 33 to engage and advance the corresponding ratchets 32 a predetermined angular distance. The sprockets turn the same amount and advance the record sheet to bring the next record perforation 21 into registration with the slit 17 so as to illuminate the corresponding key. Thus, in response to the playing of a key the record sheet is advanced automatically to the next position, where it causes the next key which is to be played to be illuminated.

Figure 5:
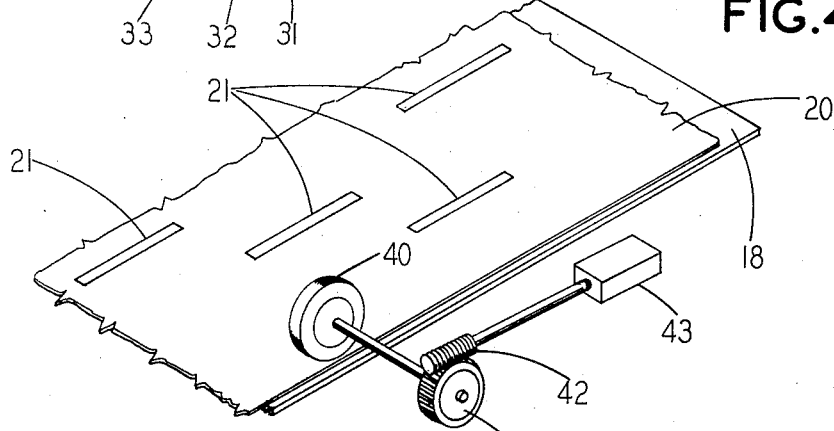
Figure 5 is a fragmentary perspective of a modified arrangement having provision for advancing the record sheet continuously at uniform speed.

An alternative embodiment, shown in Fig. 5, has provision for advancing the record sheet continuously at constant speed, thereby indicating to the child the appropriate time for each note in the song being played. Obviously, in this alternative arrangement the length of each perforation lengthwise along the record sheet determines the duration of the corresponding note. For advancing the record sheet continuously in this manner there is provided a rotary rubber roller 40 frictionally engaging the record sheet. The roller 40 is attached to a rotary gear 41 driven from a worm 42 attached to the drive shaft of a fractional horsepower motor 43. As the roller is driven from the motor it exerts sufficient pressure on the record sheet to advance the record sheet at constant speed over the underlying tray 18.

As in the first-mentioned embodiment, the various keys are illuminated in a sequence determined by the pattern of the perforations in the record sheet. Unlike the first embodiment, though, in this form of the invention the keys are illuminated successively in a predetermined timed fashion which tells the child precisely when to play the next note, as well as which note to play next.

While there have been described herein and illustrated in the accompanying drawings two preferred embodiments of this invention, it is to be understood that various modifications, omissions and refinements which depart from the disclosed embodiments may be adopted without departing from the spirit and scope of the present invention. For example, various arrangements for advancing the perforated record sheet, either intermittently in response to the playing of a key or continuously, different from the specific arrangements described herein will suggest themselves to those skilled in the art. Also, the present invention is applicable to educational keyboard-operated musical instruments generally, such as organs, celestes, and the like, as well as to pianos.

I claim:

1. An educational keyboard musical instrument comprising: a plurality of transparent keys arranged to form a keyboard, means actuated by operation of said keys for producing musical notes, a plurality of light sources positioned respectively below individual ones of said keys, means connected with said light sources for continuously energizing same, an effectively opaque record member mounted for movement over the light sources and below the keys and formed with perforations positioned to be moved into selective registration with the light sources to illuminate the key to be played, and means operated by the keys when played for moving said record member.

2. An educational keyboard musical instrument comprising: a plurality of transparent keys arranged to form a keyboard, means actuated by operation of said keys for producing musical notes, a plurality of light sources positioned respectively below individual ones of said keys, means connected with said light sources for continuously energizing same, an effectively opaque record member mounted for movement over the light sources and below the keys and formed with perforations positioned to be moved into selective registration with the light sources to illuminate the key to be played, and independently operated means advancing said record member to position the perforations successively in registration with the light sources to designate successively each key to be played.

3. An educational keyboard musical instrument comprising: a plurality of transparent keys arranged to form a keyboard, means actuated by operation of said keys for producing musical notes, light source means positioned below the keys for transmitting light through all of said keys, means connected with said light source means for continuously energizing same, an effectively opaque record member mounted for movement over the light source means and below the keys and formed with perforations positioned to be moved into selective registration with the keys to illuminate the key to be played, and means operated by the keys when played for moving said record member.

4. An educational keyboard musical instrument comprising: a plurality of transparent keys arranged to form a keyboard, means actuated by operation of said keys for producing musical notes, light source means positioned below the keys for transmitting light through all of said keys, means connected with said light source means for continuously energizing same, an effectively opaque record member mounted for movement over the light source means and below the keys and formed with perforations positioned to be moved into selective registration with the keys to illuminate the key to be played, and independently operated means advancing said record member to position the perforations successively in registration with the keys to designate successively each key to be played.

References Cited in the file of this patent

UNITED STATES PATENTS

| | | |
|---|---|---|
| 895,107 | Parduba | Aug. 4, 1908 |
| 1,607,226 | Wood | Nov. 16, 1926 |
| 2,425,006 | Rosen | Aug. 5, 1947 |
| 2,647,749 | Wales | Aug. 4, 1953 |
| 2,675,731 | Ruben | Apr. 20, 1954 |